United States Patent [19]

Stoodley

[11] 3,853,848

[45] Dec. 10, 1974

[54] PENICILLANIC ACID DERIVATIVES

[75] Inventor: Richard John Stoodley, Newcastle-Upon-Tyne, England

[73] Assignee: Beecham Group Limited, Brentford, Middlesex, England

[22] Filed: Jan. 17, 1972

[21] Appl. No.: 218,529

[30] Foreign Application Priority Data

Jan. 20, 1971   Great Britain ..................... 2736/71

[52] U.S. Cl. .............................. 260/239.1, 424/271
[51] Int. Cl. ............................................ C07d 99/16
[58] Field of Search ................................. 260/239.1

[56] References Cited
UNITED STATES PATENTS

| | | | |
|---|---|---|---|
| 3,479,401 | 11/1969 | Patchett | 260/239.1 |
| 3,647,781 | 3/1972 | Wieslogle et al. | 260/239.1 |
| 3,719,667 | 3/1973 | Gutowski | 260/239.1 |

*Primary Examiner*—Nicholas S. Rizzo

[57]     ABSTRACT

An equilibrium is established between the 6-α- and 6-β-epimers of Schiffs bases of 6-aminopenicillanic acid salts and esters by treating the 6-α- or 6-β- epimer or a mixture of the two epimers with a base. Starting from the 6-α-epimer, the 6-β-epimer can be separated from the resulting mixture of 6-α- and 6-β-epimers; the 6-β-epimer can then be treated with an acid thereby producing a salt or ester of 6-β-aminopenicillanic acid, which can be acylated to produce a salt or ester of a 6-β-acylaminopenicillanic acid.

10 Claims, No Drawings

PENICILLANIC ACID DERIVATIVES

This invention relates to a process for the epimerisation of certain derivatives of 6-aminopenicillanic acid.

As is well known, 6-aminopenicillanic acid has the structural formula (I):

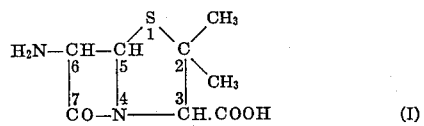

The fused ring structure of 6-aminopenicillianic acid and its derivatives, including the penicillins, is conventionally numbered as shown in formula (I). It will be recognized that this fused ring structure contains three asymmetric carbon atoms, namely atoms 3,5 and 6, and eight stereoisomeric forms of the ring structure are therefore theoretically possible. However, only one of these eight possible stereoisomeric forms gives rise to penicillins having useful antibacterial activity. The stereochemistry of the anti-bacterially active penicillins is as depicted in formula (II):

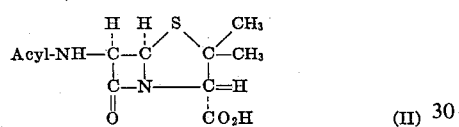

Various examples of compounds with such fused ring systems of differing stereochemical configurations are known, but for a long time there was no known method of converting one epimer into another without irreversible disruption of the fused ring system itself. However, during 1968 and 1969 it was reported that certain penicillanic acids or their esters having the same stereochemistry as the antibacterially active penicillins can be converted by treatment with bases into their epimers wherein the configuration at C6 is inverted. The former compounds are conventionally known as the 6-β-epimers and the latter as the 6-α-epimers.

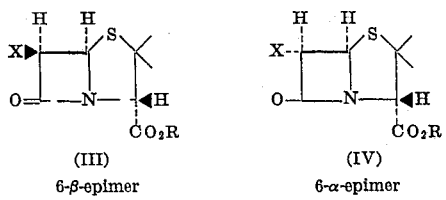

Such transformations (i.e. compounds of formula III to compounds of formula IV) have been achieved when X is the phthalimido group (V, Wolfe and Lee, Chem.-Comm. 1968,242), the 2,2-dimethyl-5-oxo-4-phenylimidazolidinyl group of hetacillin (VI, Johnson, Mania, Panetta, and Silvestri, Tetrahedron Letters, 1968, 1903), or the trimethylammonium group (VII, Clayton, Nayler, Southgate, and Stove, Chem.Comm. 1969, 130). On the other hand all attempts to effect such transformations directly with a penicillin (X=acylamino) or with 6 APA (X=$NH_2$) have failed, although in such cases transformation from the 6-β to the 6-α series can be effected indirectly via the epimerisation of hetacillin (Johnson and Mania, Tetrahedron Letters, 1969, 267).

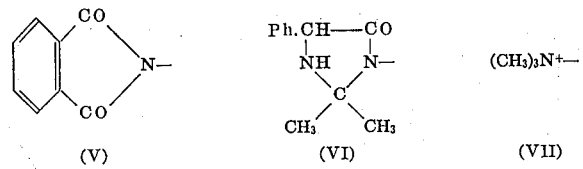

The known examples of epimerisation cited above are not only restricted with regard to the nature of the 6-substituent X, but they are also essentially unidirectional processes. In other words they enable the 6-β-epimer to be converted into the 6-α-isomer in high yield, but no detectable amount of β-isomer could be shown to be formed from the 6-α-isomer, under conditions which would have detected about 1% or more of the β-epimer.

We have now devised a process which permits the selective inversion of the configuraation at C6 in the penam ring structure of certain derivatives of 6-APA, irrespective of the configuration at C6 of the starting material. Thus the present invention for the first time enables the 6-α-epimer of a derivative of 6-APA to be converted into the 6-β-epimer.

Accordingly, in its broadest aspect, the present invention provides a process for establishing an equilibrium between the 6α and 6-β-epimers of a compound having the structural formula (VIII)

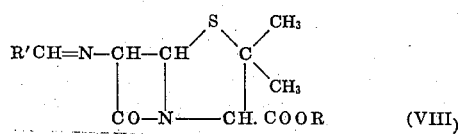

in which formula R represents an inorganic or organic cation or an organic radical, and R' represents an alkyl, aryl, aralkyl or heterocyclic radical, which process comprises treating a solution of a compound of formula (VIII) in the form of its 6α or 6-β-epimer or of a mixture of the two epimers.

In the present specification, the 6-α-epimer of a compound of formula (VIII) is defined as a compound having the stereochemical configuration shown in the formula (IX):

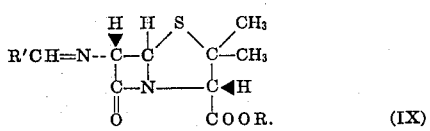

Similarly the 6-β-epimer of a compound of formula (VIII) is defined as a compound having the stereochemical configuration shown in formula (X):

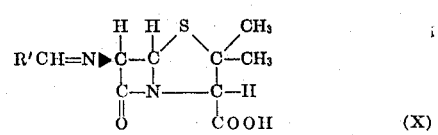

In another of its specific aspects, the present invention provides a process for the preparation of the 6-β-epimer of a compound of formula (VIII) above wherein R and R' are as hereinbefore defined, which process comprises treating a solution containing the 6-α-epimer of a compound of formula (VIII) with a base and subsequently separating the 6-β-epimer from the resulting mixture of 6-β and 6-α epimers.

Separation of the two epimers may be effected by the conventional methods such as chromatography or fractional crystallization.

The group R in formula (VIII) (and thus also in formulae (IX) and (X) may represent an inorganic or or organic cation, i.e. the compound may be a salt. The particular inorganic or organic cation employed is not critical and it may be the same cation as is present in the base with which the compound is treated. Suitable cations are the alkali metal cations such as sodium or potassium.

The group R in formula (VIII) may also be an organic radical, e.g. the compound may be an ester. When an ester is used R may be an alkyl, aralkyl, aryl, trialkylsilyl, or trialkyltin radical, any of which may be substituted. Preferred esters are those from which the carboxylic acid can be regenerated easily without disrupting the sensitive β-lactam, and these include benzyl, p-methoxybenzyl, methoxymethyl, phenacyl, trimethylsilyl, and tributyltin esters.

The group R' in formula (VIII) is an alkyl, aryl, aralkyl or heterocyclic group. As examples of suitable alkyl groups may be mentioned especially alkyl groups having from 1 to 12 carbon atoms in the chain, including straight, branched and cyclic alkyl groups, e.g. methyl, ethyl; iso- and n-propyl; n-, iso- and tert-butyl; cyclopropyl; cyclopentyl; cyclohexyl and cycloheptyl. As examples of suitable aryl groups may be mentioned, phenyl and naphthyl, while suitable heterocyclic groups include furyl, pyridyl, thienyl, indanyl and pyranyl groups. The group R' may also carry functional substituents such as dimethylamino, nitro, hydroxy, chloro, bromo and fluoro substituents.

The choice of base and solvent must be made with care so as to avoid conditions which would disrupt the sensitive β-lactam ring. When organic bases are used the preferred solvents are hydrocarbons or chlorinated hydrocarbons, (e.g. benzene, chloroform, or methylene dichloride) but other solvents which can be used include acetone, nitromethane, dimethyl sulphoxide and alcohols.

Bases such as potassium carbonate or sodium alkoxides can be used, but the preferred bases are tertiary amines. Moreover among the tertiary amines strong bases such as 1,5-diazabicyclo (4,3,0)-non-5-ene (conveniently abbreviated to DBN) are preferable to weaker bases such as triethylamine.

In carrying out the process of this invention, the base is generally added to a solution of the starting material.

The reaction conditions such as temperature and pressure are not critical, but clearly extreme conditions should be avoided in order to reduce the possibility of side reactions or irreversible disruption of the molecule. Generally we find that good results are obtained by adding the base to the solution of the starting compound over a period of from a few seconds to a few minutes, and thereafter stirring the reaction mixture at room temperature and pressure.

Although this invention is not to be limited to any particular theory of reaction mechanism, we believe that the following equilibrium is set up after treatment of the starting material with base:

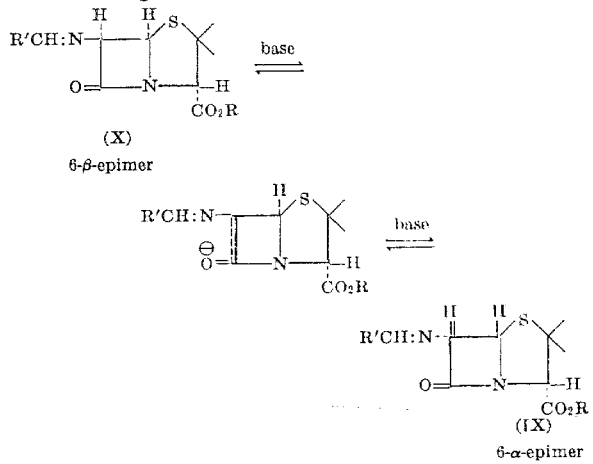

It appears that the equilibrium constant varies according to the base and solvent employed, and for any particular base and solvent, according to the steric requirements of the 6-substituent. Thus the proportion of, for example, the 6-β-isomer can be maximised by routine experimentation to find the optimum solvent, base and R' group to be employed. It appears that the identity of the group R has little bearing on the equilibrium position.

In carrying out the process of this invention, it should be noted that a complication which sometimes arises is a competing base-catalysed irreversible conversion of both the 6-α and 6-β-epimers (IX) and (X) into the isomeric thiazepine derivative of formula (XI) below (see Jackson and Stoodley, Chem. Comm. 1970,14).

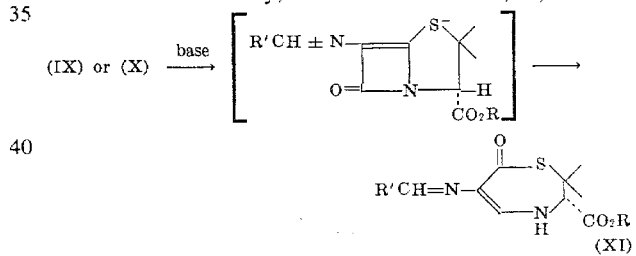

When DBN is used as the base, the equilibration between (IX) and (X) is generally complete after a few minutes at room temperature, whereas conversion into (XI) is very much slower. Under these conditions there is no difficulty in isolating the desired product (IX or X) by conventional methods such as chromatography or fractional crystallisation. However, when weaker bases are used, there is much less difference between the rate of equilibration and that of conversion into (XI). Under these conditions the progress of the various conversions can be followed by observing the NMR spectra of the reaction solution, but the isolation of (IX) or (X) is more complicated.

The starting material (VIII) may be readily prepared from 6-aminopenicillanic acid or the appropriate salt or ester thereof by reaction with an aldehyde R'CHO. Clearly the 6-α-epimer (IX) can be prepared from the 6-α-epimer of 6-APA and the 6-β-epimer (X) from the 6-β-epimer of 6-APA.

As indicated previously, the present invention finds an important application in the total chemical synthesis of penicillins having antibacterial activity. Thus, in another of its embodiments the present invention provides a process which comprises treating a solution containing the 6-α-epimer of formula (IX) with a base, separating the 6-β-epimer from the resultant mixture of 6-α- and 6-β-epimers, and in which process the said 6-β-epimer is treated with an acid, thereby producing a 6-aminopenicillanic acid derivative of formula (XII):

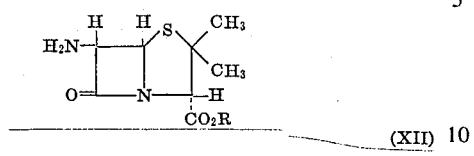

(XII)

wherein R has the same meaning as in formula (VIII) above.

In a further aspect, the present invention provides a process in which the 6-aminopenicillanic acid derivative of formula (XII) is acylated to produce a compound of formula (XIII):

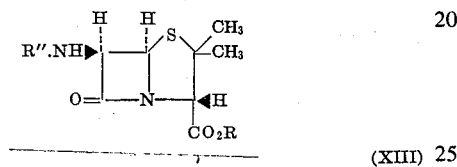

(XIII)

wherein R has the same meaning as in formula (VIII) above, and R'' is an acyl group.

Suitable acids which may be used in the treatment of the 6-β-epimer (X) in order to produce the compound (XII) include alkyl- and arylsulphonic acids such as p-toluenesulphonic acid.

Reactive acylating derivatives capable of acylating the 6-amino group of compound (XII) are well known from the semi-synthetic penicillin art. They include acid halides, e.g. the chlorides, anhydrides, mixed anhydrides and the reactive derivative formed with it a carboxylic acid and a carbodiimide.

Some specific embodiments of the present invention will now be described in the following Examples.

Example 1

The 6-α- and 6-β-epimers of methoxymethyl 6-(2-hydroxy1-naphthyl-idenimino) penicillanate.

a. Methoxymethyl 6-β-(2-hydroxy-1-naphthylidenimino)-penicillanate (497 mg) was suspended in methylene chloride (8 ml.) and treated with 1,5-diazabicyclo (4,3,0)non-5-ene (hereinafter abbreviated to DBN) (0.025 ml.). The reaction was followed by observing the rise and fall of the imine proton signals in the nuclear magnetic resonance (NMR) spectrum. When equilibrium had been reached the resulting solution was diluted with chloroform and washed successively with 0.1N hydrochloric acid, dilute sodium bicarbonate solution, and water. It was then dried over anhydrous magnesium sulphate and evaporated under reduced pressure to leave the mixed epimers as an orange syrup.

The syrup (437mg.) was fractionated on a silica (Mallinckrodt AR100) column by elution with chloroform/ether (2:1). The total return from the column was 80% and the treatment afforded pure β-epimer (117 mb.; 27%) which was crystallised from methanol to give orange crystals, m.p. 109–110°, $(\alpha)_D$ + 24°(CHCl$_3$), which showed the following NMR spectrum in CDCl$_3$:

τ0.55 (1H, s), 1.7–3.0 (6H, complex), 4.22 (1H, d, J 5Hz), 4.60 (3H, superimposed signals), 5.40 (1H, s), 6.43 (3H, s), 8.27 (3H, s), 8.40 (3H, s).

The other product from the column was the α-epimer (152 mg., 35%) as an orange syrup, $(\beta)_D$ + 337° (CDCl$_3$), with the following NMR spectrum in CDCl$_3$:

τ0.53 (1H, s), 1.4-2.9 (6H, complex), 4.35 (1H, d, J 2Hz), 4.54 (2H, s), 4.90 (1H, d, J 2Hz), 5.28 (1H, s), 6.39 (3H, s), 8.25 (3H, s), 8.39 (3H, s).

b. Methoxymethyl 6-α-(2-hydroxy-1-naphthylidenimino)-penicillanate (63mg) was suspended in methylene chloride (0.5 ml.) and treated with DBN (trace amounts), the reaction being carried out in an NMR tube. The reaction was followed by observation of the rise and fall of the imine proton signals in the NMR spectrum. The resulting solution was diluted with chloroform, washed with aqueous 0.1N hydrochloric acid, washed with an aqueous solution of sodium bicarbonate, dried with anhydrous magnesium sulphate and evaporated under reduced pressure to afford a mixture of α- and β-epimers as an orange syrup.

The observed ratio of α-epimer to β-epimer in this syrup was 61% α-epimer: 39% β-epimer.

Example 2

Recovery of methoxymethyl 6-β-aminopenicillanate from the 2-hydroxy-1-naphthylidene derivative.

The β-isomer of the Schiff's base from Example 1 (82 mg.) was dissolved in acetone (2ml.) and treated with p-toluenesulphonic acid (38 mg.). The solution was kept at room temperature for 15 min., then diluted with ether to give a pale yellow precipitate of methoxymethyl 6-β-aminopenicillanate p-toluenesulphonate salt (50 mg.).

Example 3

The 6-α- and 6-β-epimers of methoxymethyl 6-p-nitrobenzylideniminopenicillanate.

The p-nitrobenzylidene compound was treated with DBN according to the general procedure of Example 1, but using the solvents listed in the table. Instead of separating the epimers by chromatography, the composition of the mixture was determined from the NMR spectra. The relative proportions of α- and β-isomers at equilibrium are tabulated below:

| Solvent | Reaction followed by observation of | | Equilibrium ratioα: β |
|---|---|---|---|
| | α-isomer signal | β-isomer signal | |
| CDCl$_3$ | 1.42 (s) | 1.24 (d,J 2Hz) | 80:20 |
| MeI | 1.20 (s) | 1.09 (d,J 2Hz) | 80:20 |
| C$_6$D$_6$ | 4.40 (d,J 2Hz) | 4.62 (d,J 5Hz) | 70:30 |
| CH$_2$Cl$_2$ | 1.38 (s) | 1.21 (d,J 2Hz) | 81:19 |
| MeOH | 1.34 (s) | 1.22 (d,J 2Hz) | 65:35 |
| MeNO$_2$ | 1.33 (s) | 1.24 (d,J 2Hz) | 85:15 |
| Me$_2$SO | 5.30 (s) | 5.54 (s) | 76:24 |

Example 4

The 6-α- and 6-β-epimers of methoxymethyl 6-furfurylideniminopenicillanate.

DBN (traces) was added to the furfurylidene compound (90 mg.) in methylene chloride (0.5 ml.) the reaction being carried out in an NMR tube. The rise and fall of the imine proton signals were observed (αisomer, 1.71 (s); βisomer, 1.57 (d, J 2Hz) and when equilibrium had been established the solution was diluted with chloroform and washed successively with 0.1N hydrochloric acid, dilute sodium bicarbonate solution, and water. The solution was dried over anhydrous magnesium sulphate and the solvents were removed in vacuo to leave an orange syrup estimated to contain 80% of the α-isomer and 20% β-isomer.

The NMR spectra in CDCl₃ gave the following values:

α-isomer:
1.66 (1H, s), 2.26 (1H, d, J 2Hz), 2.98 (1H, d, J 4Hz), 3.34 (1H, d of d, J 4Hz, J 2Hz), 4.35 (1H, d, J 2Hz), 4.57 (2H, s), 4.99 (1H, d, J 2Hz), 5.34 (1H, s) 6.42 (3H, s), 8.42 (3H, s).

β-isomer:
1.37 (1H, d, J' 2Hz), 2.25 (1H, s), 2.97 (1H, d, J 5Hz), (1H, d of d, J 5Hz, J' 2Hz), 4.25 (1H, d, J 5Hz), 4.48 (1H, d, J 5Hz), 4.58 (2H, s), 5.51 (1H, s), 6.43 (3H, s), 8.31 (3H, s), 8.43 (3H, s).

Example 5

The 6-α- and 6-β-epimers of methyl 6-benzylidenimino penicillanate

A solution of DBN (0.03 millimole) in CDCl₃ (0.1 ml.) was added to a solution of the benzylidene compound (0.3 millimole) in CDCl₃ (0.25 ml.), the reaction being carried out in an NMR tube. The rise and fall of the imine proton signals (αisomer, 1.53 (s); βisomer, 1.36 (d, J 2Hz) were observed. After a few minutes equilibrium was established at approximately 80% α and 20% βisomer.

The complete NMR spectra in CDCl₃ had the following values:

α-isomer:
1.53 (1H, s), 1.9–2.7 (5H, complex), 4.44 (1H, d, J 2Hz), 5.04 (1H, d, J 2Hz), 5.40 (1H, s), 6.20 (3H, s), 8.33 (3H, s), 8.50 (3H, s).

β-isomer:
1.38 (1H, d, J' 2Hz), 1.8–2.7 (5H, complex), 4.33 (1H, d, J 5Hz), 4.63 (1H, d of d, J 5Hz, J 2Hz), 5.56 (1H, s), 6.23 (3H, s) 8.35 (3H, s), 8.50 (3H, s).

Example 6

The 6-α and 6-β-epimers of tri n butyltin 6-benzylideniminopenicillanate

The procedure of Example 5 was repeated with the tri-n-butyltin ester and the equilibrium mixture was estimated to contain 80% of the α and 20% of the β isomer.

τvalues for α-isomer:
1.54 (1H, s), 4.51 (1H, d, J 2Hz), 5.13 (1H, d, J 2Hz), 5.50 (1H, s).

τvalues for β-isomer:
1.34 (1H, d, J 2Hz), 4.33 (1H, d, J 5Hz), 4.63 (1H, d, J 5Hz, J' 2Hz), 5.58 (1H, s).

Example 7

The 6-α- and 6-β-epimers of 6(2-hydroxy-1-naphthylidenimino)-penicillanic acid

The procedure of Example 5 was repeated with the DBN salt of 6(2-hydroxy-1-naphthylidenimino)-penicillanic acid in the presence of a small excess of DBN. Equilibrium was established at approximately 60% α isomer and 40% β isomer, but soon afterwards NMR signals indicative of further rearrangement to a thiazepine derivative began to appear. Characteristic τ values (in CDCl₃) were:

α-isomer:
0.76 (1H, s), 4.41 (1H, d, J 2Hz), 5.08 (1H, d, J 2Hz), 5.54 (1H, s).

β-isomer:
0.76 (1H, s), 4.18 (1H, d, J 5Hz), 4.70 (1H, d, J 5Hz), 5.58 (1H, s).

thiazepine:
0.60 (1H, s), 5.62 (1H, s).

Example 8

Action of potassium carbonate on methyl 6-benzylideniminopenicillanate

Anhydrous potassium carbonate (101 mg.) was added to a solution of methyl 6-benzylideniminopenicillanate (0.6 millimole) in dry, distilled acetone (5ml.). The mixture was stirred at room temperature for 10 min., then diluted with chloroform (20 ml.), filtered, and the filtrate washed and dried. Evaporation under reduced pressure left a pale yellow syrup estimated by NMR (see Example 5) to contain about 80% of the α-isomer and 20% β-isomer.

Example 9

Action of sodium ethoxide on the sodium salt of 6-benzylideniminopenicillanate

An ethanolic solution of sodium ethoxide was added dropwise to a solution of the benzylidene compound (98 mg.) in ethanol (0.4 ml.), the reaction being carried out in an NMR tube. Equilibrium was established at approximately 80% α-isomer and 20% β-isomer, but immediately afterwards signals characteristic of rearrangement to a thiazepine derivative began to appear.

I claim:
1. A process for the preparation of the 6-β-epimer of a compound of the formula:

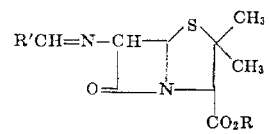

wherein
R is selected from sodium, potassium, benzyl, p-methoxybenzyl, methoxymethyl, phenacyl, trimethylsilyl and tributyltin, and
R' is selected from alkyl of 1–12 carbon atoms, cyclopropyl, cyclopentyl, cyclohexyl, cycloheptyl, phenyl, naphthyl, furyl, pyridyl, thienyl, indanyl and pyranyl and each of said group substituted by dimethylamino, nitro, hydroxy, chloro, bromo or fluoro,
which comprises adding to a solution of a compound of the above formula an epimerizing non-B-lactam rupturing base selected from tertiary amines, alkali carbonates and alkali alkoxides, and separating the 6-β-epimer from the resulting mixture of 6-α- and 6-β-epimers.

2. A process according to claim 1 in which the separation of the two epimers is effected by chromatography or fractional crystallisation.

3. A process according to claim 1 in which the base is 1,5-diazabicyclo (4,3,0)-non-5-ene.

4. A process according to claim 1 in which the base is 1,5-diazabicyclo (4,3,0)-non-5-ene.

5. A process according to claim 1 in which the said 6-β-epimer is acidified, thereby producing a 6-aminopenicillanic acid derivative of formula:

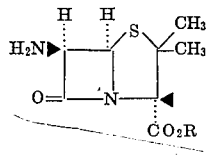

wherein R is as defined in claim 1.

6. A process according to claim 5 in which the said 6-aminopenicillanic acid derivative is acylated.

7. A process according to claim 6 in which the said acid is p-toluenesulphonic acid.

8. A process according to claim 1 wherein the base is added to the solution of the compound over a period of a few seconds to a few minutes and stirring the resulting mixture at room temperature and atmospheric pressure.

9. A process for the preparation of the 6-β-epimer of a compound of the formula:

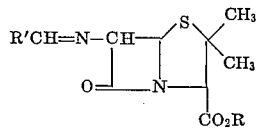

wherein

R is selected from sodium, potassium, benzyl, p-methoxybenzyl, methoxymethyl, phenacyl, trimethylsilyl and tributyltin, and R' is selected from alkyl of 1–12 carbon atoms, cyclopropyl, cyclopentyl, cyclohexyl, cycloheptyl, phenyl, naphthyl, benzyl, furyl, pyridyl, thienyl, indanyl and pyranyl and each said group substituted by dimethylamino, nitro, hydroxy, chloro, bromo or fluoro, which comprises adding to a solution of a compound of the above formula under non-β-lactam rupturing conditions an epimerizing base selected from 1,5-diazabicyclo-(4,3,0)non-5-ene, triethylamine, potassium carbonate and sodium alkoxide, the epimerization when carried out with an organic base being effected in a solvent selected from benzene, chloroform, methylene dichloride, acetone, nitromethane, dimethylsulphoxide, methanol and ethanol.

10. A process according to claim 9 wherein an equilibrium between the 6-α- and 6-β-epimers of the compound is established within a few seconds to a few minutes by stirring at room temperature and atmospheric pressure.

* * * * *

UNITED STATES PATENT AND TRADEMARK OFFICE
CERTIFICATE OF CORRECTION

PATENT NO. : 3,853,848
DATED : December 10, 1974
INVENTOR(S) : Richard John Stoodley It is certified that error appears in the above—identified patent and that said Letters Patent are hereby corrected as shown below:

In claim 4, line 1, "claim 1" should be --claim 10--.

Signed and Sealed this

Tenth Day of August 1976

[SEAL]

Attest:

RUTH C. MASON
Attesting Officer

C. MARSHALL DANN
Commissioner of Patents and Trademarks